(12) United States Patent
Herzog

(10) Patent No.: US 11,401,142 B2
(45) Date of Patent: Aug. 2, 2022

(54) REAR VEHICLE LIFT SYSTEM

(71) Applicant: Gray Manufacturing Company, Inc., St. Joseph, MO (US)

(72) Inventor: Ryan Herzog, Albany, MO (US)

(73) Assignee: Gray Manufacturing Company, Inc., St. Joseph, MO (US)

(*) Notice: Subject to any disclaimer, the term of this patent is extended or adjusted under 35 U.S.C. 154(b) by 97 days.

(21) Appl. No.: 17/125,243

(22) Filed: Dec. 17, 2020

(65) Prior Publication Data

US 2021/0188605 A1 Jun. 24, 2021

Related U.S. Application Data

(60) Provisional application No. 62/951,139, filed on Dec. 20, 2019.

(51) Int. Cl.
*B66F 7/00* (2006.01)
*B66F 7/26* (2006.01)
*B60S 13/00* (2006.01)

(52) U.S. Cl.
CPC .............. *B66F 7/26* (2013.01); *B60S 13/00* (2013.01)

(58) Field of Classification Search
CPC ...... B66F 7/00; B66F 7/20; B66F 7/26; B66F 7/0693; B60S 13/00
See application file for complete search history.

(56) References Cited

U.S. PATENT DOCUMENTS

| 3,758,076 A * | 9/1973 | Tranchero | B66F 5/04 254/8 R |
| 10,968,086 B1 * | 4/2021 | Tennant | B66F 7/08 |
| 2017/0029254 A1 * | 2/2017 | Jorgensen | B66F 5/04 |
| 2021/0188605 A1 * | 6/2021 | Herzog | B66F 7/0625 |

OTHER PUBLICATIONS

Garage & Shop—Gray, Lazzar's HCRCnow, Floor Jack & Hydraulic Cylinder Repair Center, https://www.hcrcnow.com/shop/garage-shop/product/68210.

* cited by examiner

*Primary Examiner* — Lee D Wilson
(74) *Attorney, Agent, or Firm* — Hovey Williams LLP; Kameron D. Kelly

(57) ABSTRACT

A portable vehicle lift and methods of using the same are provided. The portable vehicle lift comprises a carriage, a head saddle, and a lift driver. The head saddle is movably connected to the carriage so that it is shiftable between a lowered position and a raised position. The lift driver supported on the carriage and configured to lift the head saddle.

20 Claims, 12 Drawing Sheets

REAR VEHICLE LIFT SYSTEM

RELATED APPLICATIONS

This application claims the priority benefit under 35 U.S.C. § 119(e) of U.S. Provisional Patent Application Ser. No. 62/951,139 entitled "REAR VEHICLE LIFT SYSTEM," filed Dec. 20, 2019, the entire disclosure of which is incorporated herein by reference.

FIELD OF THE INVENTION

The present invention generally relates to vehicle lift systems. More particularly, the invention concerns a portable vehicle lift.

BACKGROUND

Heavy-duty floor service jacks and vehicle support stands are vital pieces of equipment in the tire service industry. For larger vehicles, such as semi-tractors, tire technicians use a combination of heavy-duty floor service jacks and heavy-duty vehicle support stands to lift and support semi-tractors to change tires on tandem axles. The average time for a tire technician to lift and set the tandem axles on vehicle support stands is around five minutes. In order to change eight rear tires on the tandem axles, the tire technician must properly place the floor service jack for raising, raise the semi-tractor, and place two vehicle support stands. This process is repeated twice, once for the rear tandem axle and once for the forward tandem axle. This slows the tire service process, which increases labor costs and losses associated with vehicle maintenance.

The background discussion is intended to provide information related to the present invention which is not necessarily prior art.

BRIEF SUMMARY

Embodiments of the present technology relate to lift systems and methods for operation. In one aspect, a portable vehicle lift is provided. The portable vehicle lift comprises a carriage, a head saddle, and a lift drive. The head saddle is movably connected to the carriage so that it is shiftable between a lowered position and a raised position. The lift driver is supported on the carriage and is configured to lift the head saddle.

In a more specific aspect, a portable vehicle lift is provided. Generally, the portable vehicle lift comprises: (i) an inner frame comprising a first end, a second end opposite the first end, and an intermediate portion located between the first end and the second end; (ii) an outer frame comprising a first end, a second end opposite the first end, and an intermediate portion located between the first end and the second end and pivotally connected to the intermediate portion of the inner frame; (iii) a head saddle connected to the first end of the inner frame; and (iv) a lift driver connected to the inner frame and the outer frame and configured to rotate the inner frame relative to the outer frame so as to shift the head saddle between a lowered position and a raised position. Furthermore, the head saddle may comprise a pair of spaced apart support elements configured to cradle an axle housing of the vehicle when the head saddle is in the raised position.

In another aspect, a method of lifting a vehicle is provided. The method comprises guiding a head saddle of a portable lift underneath a rear end of the vehicle. The portable lift includes an outer frame and an inner frame, with the head saddle being coupled with an outer end of the inner frame. An additional step includes lifting, via a lift driver of the portable lift, the head saddle into engagement with a portion of an axle of the vehicle. During the lifting, the inner frame and the outer frame rotate with respect to each other in a scissor-like manner. A further step includes lifting, via the portable lift, the rear end of the vehicle at least partially off the ground. During this lifting, the head saddle is configured to cradle an axle housing of the vehicle via the support elements of the head saddle being positioned on either side of the axle housing.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

Figure 1:
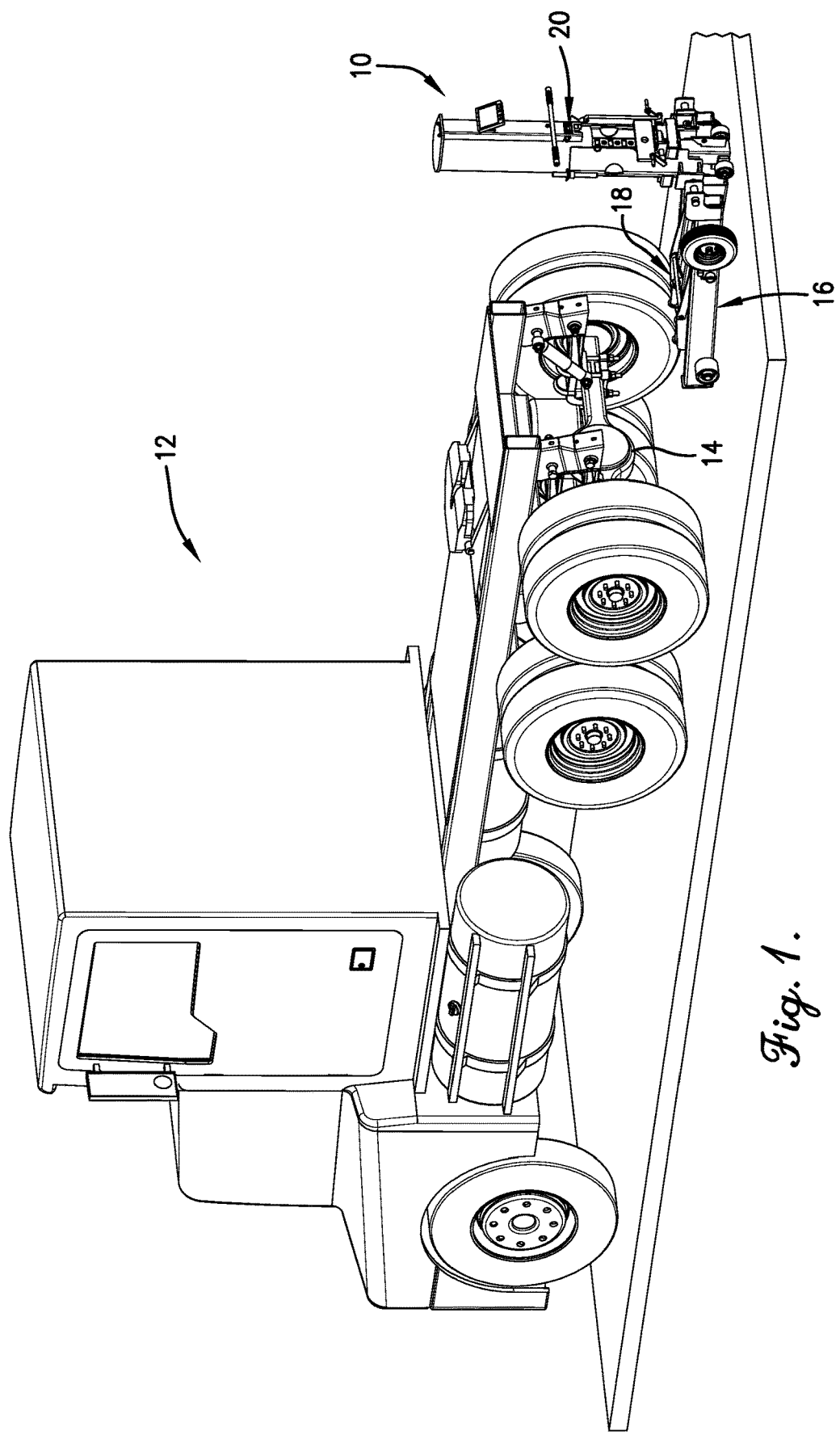
FIG. 1 illustrates an exemplary portable lift according to embodiments of the present invention positioned at a rear end of a vehicle.
Figure 2:
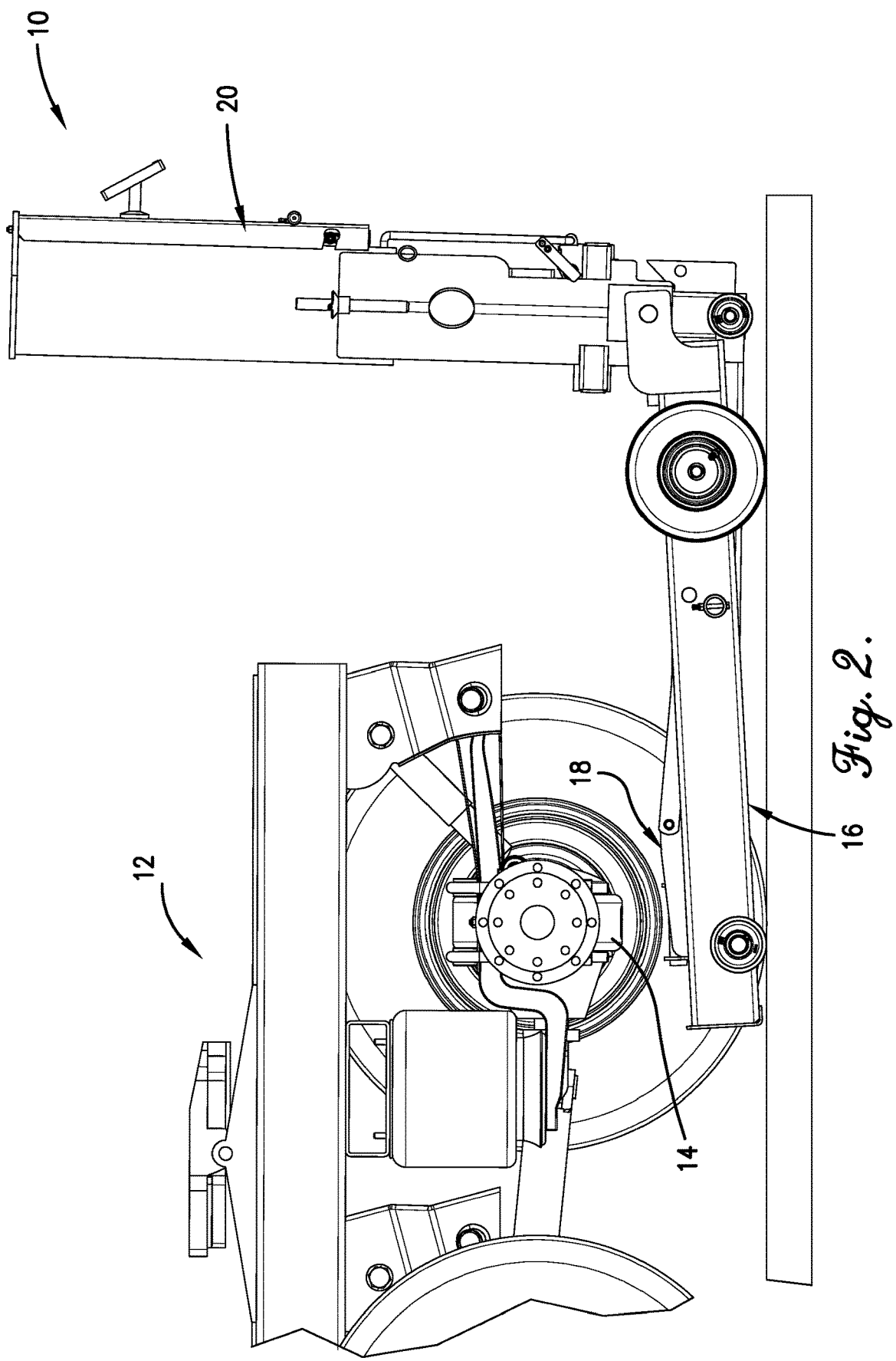
FIG. 2 illustrates the portable lift depicted in FIG. 1 positioned under the vehicle.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION OF PREFERRED EMBODIMENTS

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring now to the drawings, and initially to FIGS. 1-5, a portable vehicle lift 10 is depicted. The portable vehicle lift 10 is provided for lifting a vehicle 12, and particularly a semi-tractor 12 with a rear tandem axle housing 14. The lift 10 may be used to raise the vehicle 12 from a backside of the vehicle 12, the sides of the vehicle 12, or even the front end of the vehicle 12. The lift 10 broadly comprises a carriage 16, a head saddle 18 movably connected to the carriage 16, and a lift driver 20.

Turning to FIGS. 6-9, the lift 10 is mobile so that the carriage 16 can be positioned at least partially under the vehicle 12 and provide leverage for lifting the head saddle 18 and therefore the vehicle 12. The carriage 16 may comprise an inner frame member 22 and an outer frame member 24 positioned outside the inner frame member 22. The inner frame member 22 may comprise a pair of parallel beams connected at one end by the head saddle 18. Specifically, the inner frame member 22 may have a first end 26 attached to the head saddle 18, a second end 28 pivotally attached to the lift driver 20, and a first set of wheels 30 rotatably attached to the second end 28 of the frame member 22. The first end 26 may be pivotally attached to the head saddle 18 so that the head saddle 18 can pivot about a horizontal axis relative to said inner frame member 22. The second end 28 of the inner frame member 22 is pivotally attached to the lift driver 20 so that an angle between the driver 20 and the frame member 22 may be changed so that the first end 26 can lift the head saddle 18 with a force provided by the lift driver 20. Specifically, the lift driver 20 is configured to impart a force on the carriage 16 to cause the first end 26 of the inner frame member 22 to lift the saddle 18. The wheels 30 allow the second end 28 of the inner frame member 22 to move horizontally as the head saddle 18 is raised. This facilitates the head saddle 18 remaining in engagement with the axle housing 14 of the vehicle 12 to prevent the axle housing 14 from sliding off the head saddle 18 during lifting/lowering operations.

The outer frame member 24 is swivably connected to the inner frame member 22 in a scissor-like configuration. The outer frame member 24 may comprise a first end 32 pivotally attached to the lift driver 20, and a second end 34 extending away from the first end 32. The outer frame member 24 may comprise a pair of parallel beams 36, 38 connected by a lateral beam 40 to form an open-ended rectangular shape that defines an inner space 42. The inner frame member 22 and head saddle 18 may be positioned inside the inner space 42 when in a lowered position.

The outer frame member 24 may also comprise a set of wheels 44, 46 for enabling the carriage 16 to be mobile. A pair of the wheels 44 may be set back from the second end 34 of the outer frame member 24 a distance so that the wheels 44 may roll on the ground. The wheels 46 may be rotatably connected to the first end 32 of the second fame member 24. The wheels 46 may also roll on the ground when the head saddle 18 is in the lowered position but are raised off the ground when the head saddle 18 is raised above a certain height.

In some embodiments, the carriage 16 may comprise a swivel joint 50 that swivably connects the inner frame member 22 and the outer frame member 24. The swivel joint 50 may connect the frame members 22, 24 at intermediate portions 52, 54 of the frame members 22, 24. Specifically, the intermediate portion 52 of the inner frame member 22 may be located between its first and second ends 26, 28. The intermediate portion 54 of the outer frame member 24 may also be located between its first and second ends 32, 34. This enables the first and outer frame members 22, 24 to swivel relative to one another in a scissor action.

The head saddle 18 is attached to the first end 26 of the inner frame member 22 and is configured to engage the axle housing 14, or a different portion, of the vehicle 12 for lifting the vehicle 12. The head saddle 18 may comprise a generally rectangular base frame that supports a pair of support elements, such as cradle support bars 56, 58. The support bars 56, 58 may comprise sections of round bars that are orientated generally longitudinally (e.g., parallel with the beams of the inner and outer frame members 22, 24. The support bars 56, 58 may be parallel with each other and may generally be spaced a part a sufficient distance so that a portion of the axle housing 14 can be cradled by the bars 56, 58 to prevent, for example, horizontal movement of the axle housing 14 when the lift 10 is being used to raise the vehicle 12. In some embodiments, the bars 56, 58 may be generally aligned with the beams of the inner frame member 22 such that both bars 56, 58 are positioned interior to the beams 36, 38 of the outer frame member 24. Although the bars 56, 58 may be oriented parallel to one another, in other embodiments, the bars 56, 58 may form various angles with respect to each other (e.g., acute or obtuse angles) depending on a profile of the axle housing 14 that is to be supported by the head saddle 18. As such, the head saddle 18 may comprise any configuration for engaging the axle housing 14 or other portion of the vehicle 12. For example, the head saddle 18 may be detachable from the first end 26 of the inner frame member 22 so that a head saddle with a different profile can be attached. Additionally or alternatively, an adapter may be attached to the head saddle 18 for engaging a portion of the vehicle 12.

In some embodiments, the lift 10 may comprise one or more links 60, 62 that maintain a horizontal orientation and/or attitude of the head saddle 18 in both the raised position and lowered position and when moving between the two positions. The links 60, 62 may comprise first ends 64 pivotally attached to the outer frame member 24, and second ends 66 pivotally attached to the head saddle 18. The links 60, 62 may be configured to keep the head saddle 18 parallel with the ground to prevent the axle housing 14 from sliding off the head saddle 18.

The lift driver 20 is coupled with the carriage 16 and is configured to provide the force necessary to lift the head saddle 18 and the vehicle 12. The lift driver 20 may comprise a driver frame 68, a post 70, a locking mechanism 72, and a drive unit 74. The driver frame 68 supports the locking mechanism 72. The first end 32 of the outer frame member 24 may be pivotally connected to the driver frame 68 so that when the drive unit 74 lifts the driver frame 68, the first end 32 of the outer frame member 24 is lifted with the driver frame 68.

The post 70 extends from the drive unit 74 and provides a platform that the drive unit 74 uses to leverage the inner frame member 22 and/or outer frame member 24 to lift the head saddle 18 and therefore the vehicle 12. In some embodiments, the post 70 is pivotally connected to the second end 28 of the inner frame member 22 so that as the drive unit 74 lifts the driver frame 68 relative to the post 70, the first end 32 of the outer frame member 24 is separated from the second end 28 of the inner frame member 22. This results in the first end 26 of the inner frame member 22 being separated from the second end 34 of the outer frame member 24. Specifically, the lift driver 20 is configured to actuate (e.g., respectively rotate) the inner and outer frame members 22, 24 in a scissor-like manner, with the first end 26 of the inner frame member 22 being raised (thereby causing a corresponding raising of the head saddle 18 and vehicle with which the head saddle 18 may be engaged). The post 70 may comprise a plurality of holes 76 for receiving a portion of the locking mechanism 72 to secure the driver frame 68 at a certain height relative to the post 70, thereby securing the head saddle 18 and vehicle 12 at a certain height.

Figure 8:
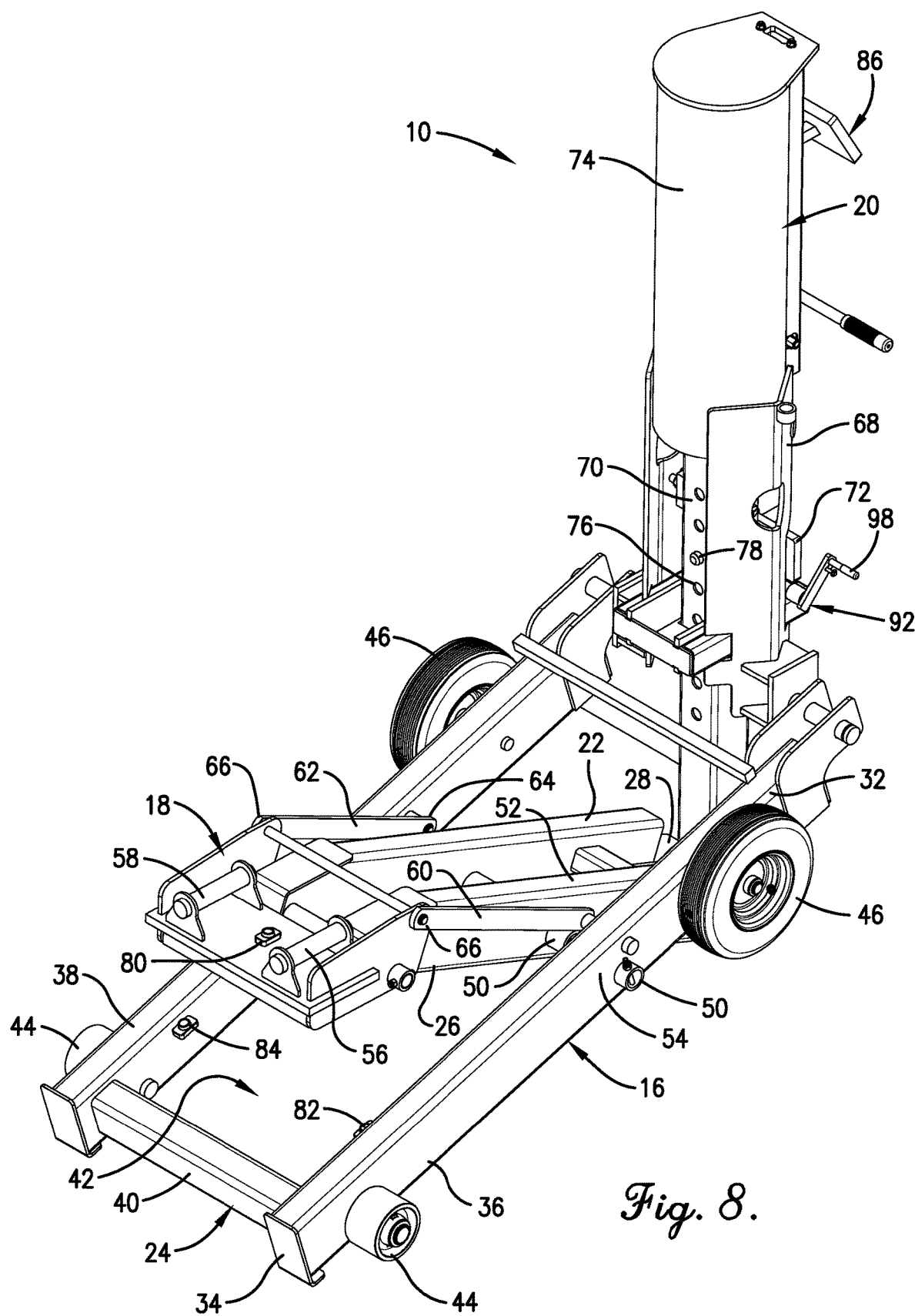
FIG. 8 illustrates a perspective front view of the lift depicted in FIG. 1 in a raised position.
Figure 9:
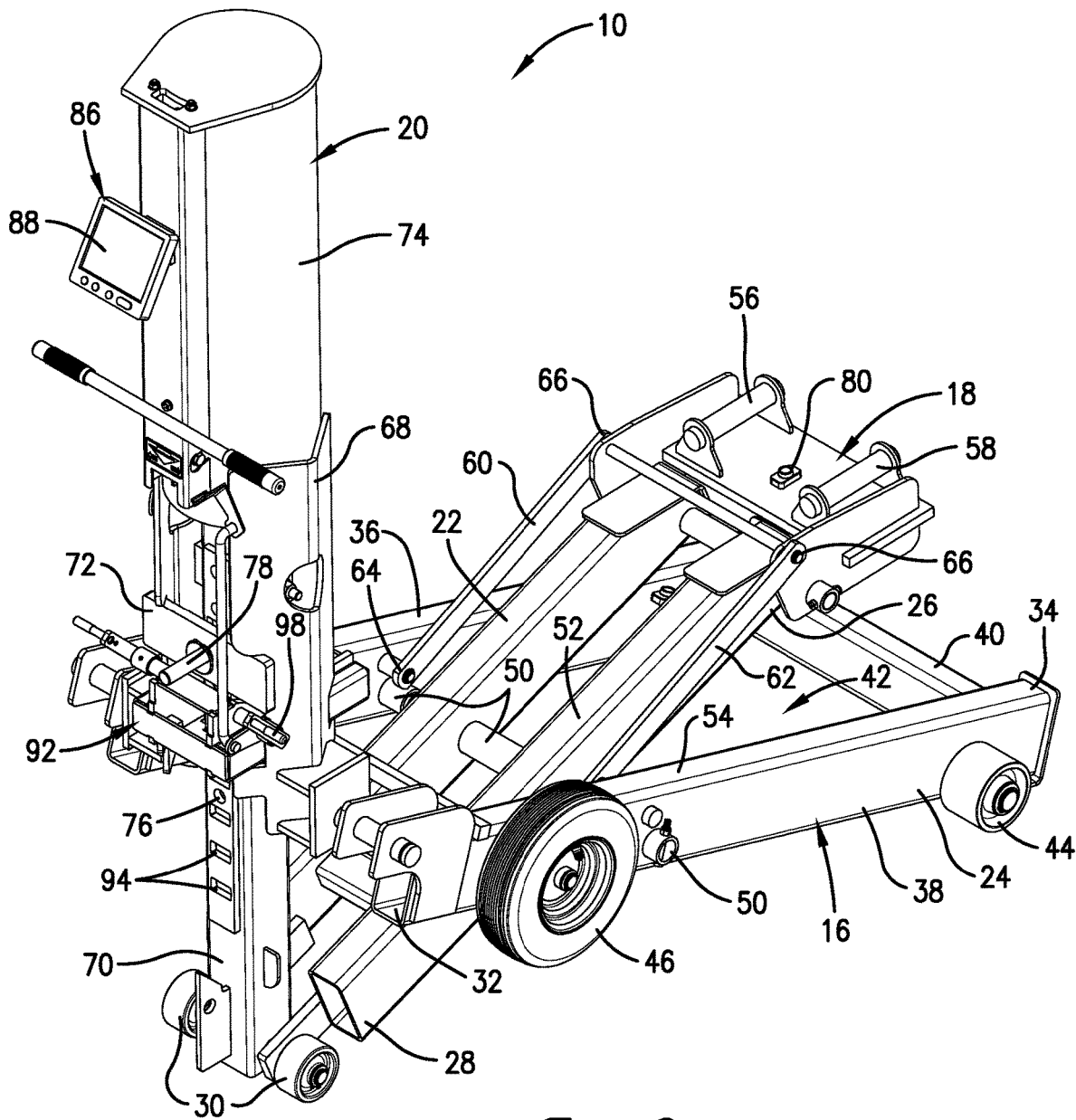
FIG. 9 illustrates a perspective rear view of the lift depicted in FIG. 1 in a raised position.
Figure 10:
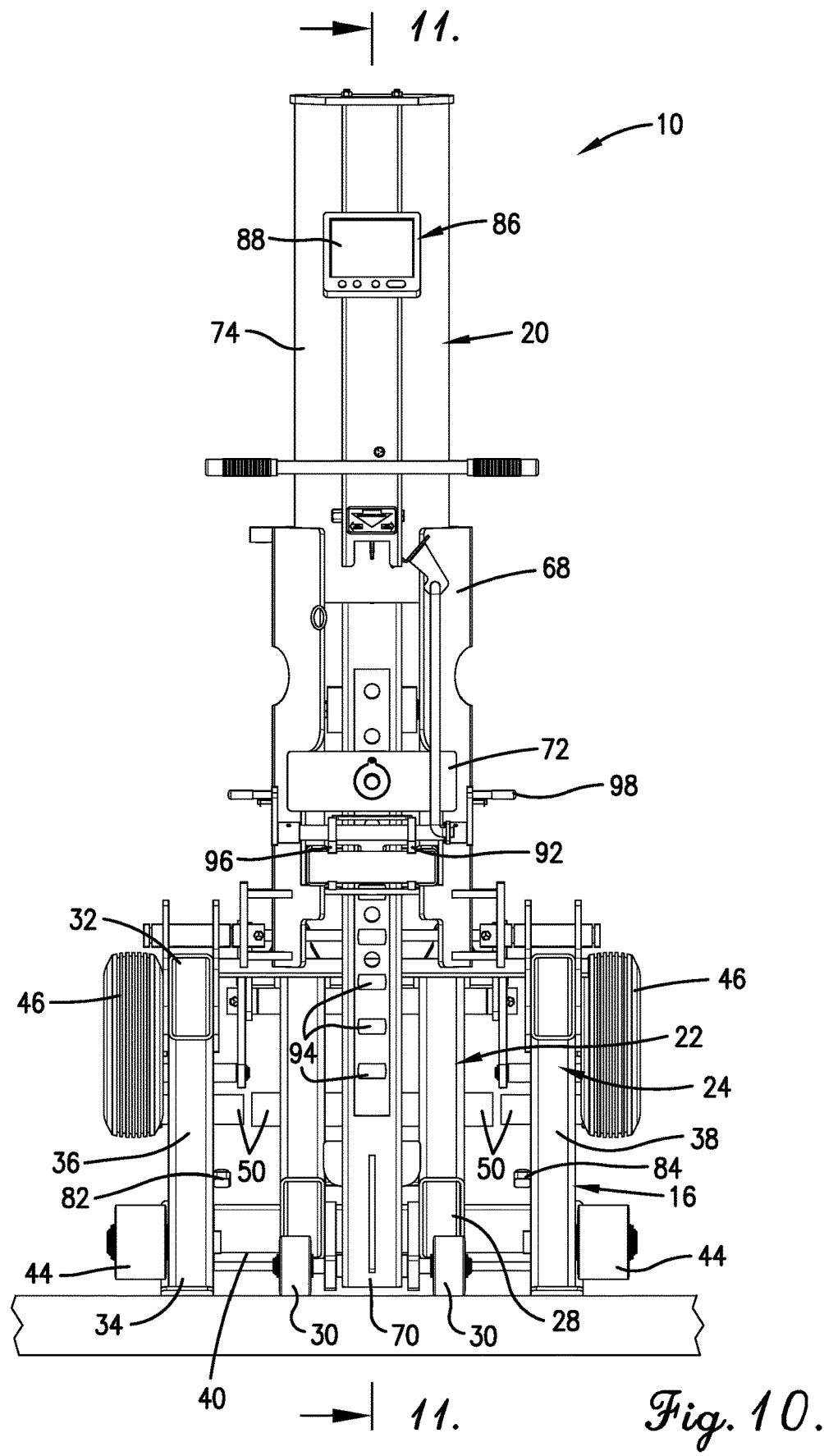
FIG. 10 illustrates a rear view of the lift depicted in FIG. 1 in a raised position.
Figure 11:
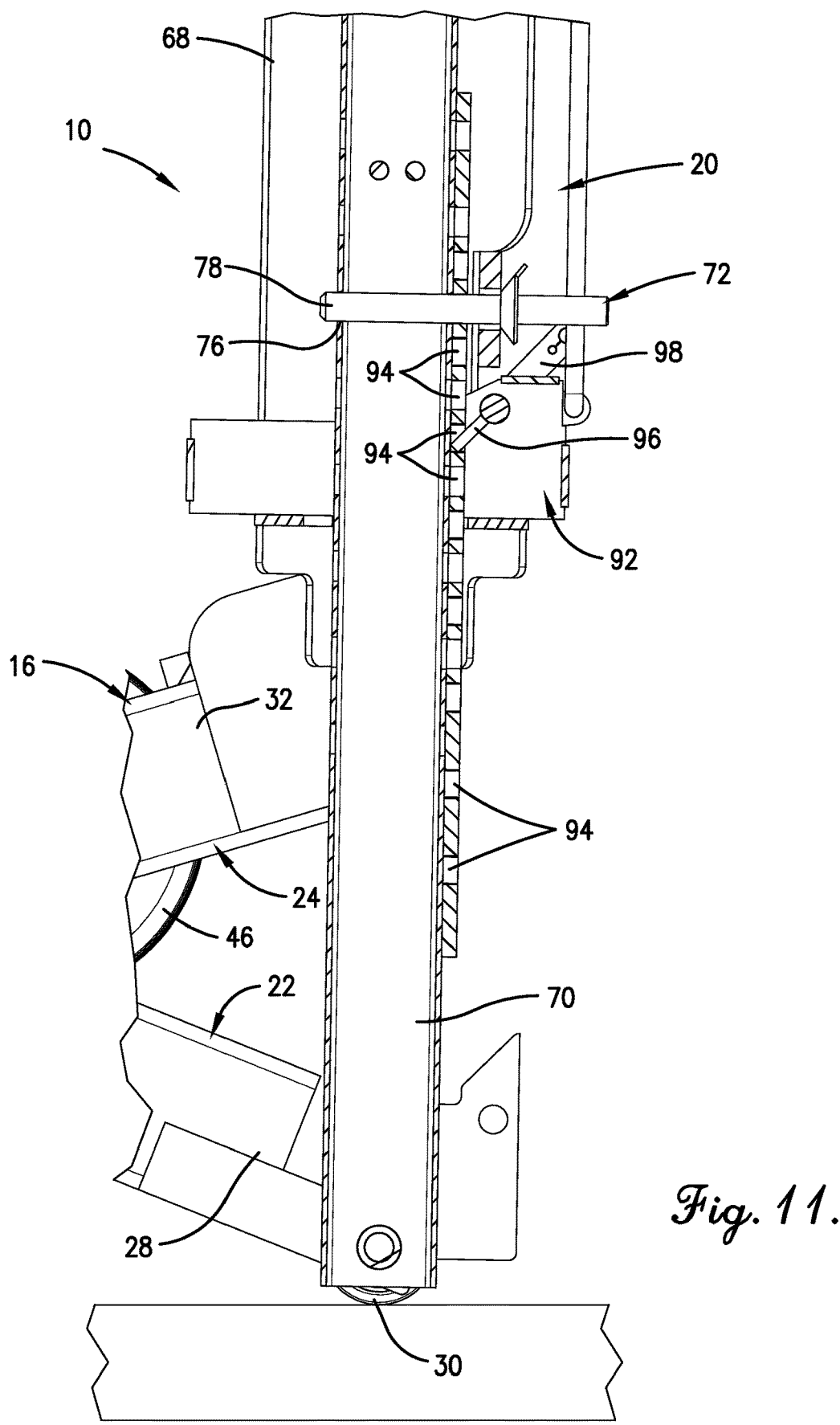
FIG. 11 illustrates a sectional side view of the lift depicted in FIG. 1 in a raised position.

In more detail, the locking mechanism 72 is configured to secure the head saddle 18 at certain heights, such as in a raised position. The locking mechanism 72 may be attached to the driver frame 68 and may comprise a retention pin 78 (as depicted in FIGS. 8, 9, and 11) that is configured to protrude into one of the holes 76 of the post 70. In more detail, the locking mechanism 72 may include a base element that is rigidly secured to the driver frame 68, with the retention pin 78 configured to actuate with respect to the base element, selectively into and out of engagement with one of the holes 76 of the post 70. The retention pin 78 may be manually actuated, such as with a handle, and/or the retention pin 78 may be actuated mechanically (such as via an electric motor), pneumatically, hydraulically, and/or via solenoid-actuation. With retention pin 78 inserted within one of the holes 76 of the post 70, the driver frame 68 is securely positioned with respect to the post 70, such that the head saddle 18 can be securely held at a given height (e.g., the driver frame 68 and the post 70 are held rigidly in place with respect to each other, such that the inner and outer frame members 22, 24 are held rigidly in position with respect to each other). As such, the lift 10 can function as a support stand to sturdily support a vehicle at a given height for repair, maintenance, or the like (as will be described in more detail below).

The drive unit 74 moves the drive frame 68 relative to the post 70. The drive unit 74 may comprise one or more telescoping cylinders, a metal bolt with threads, or the like, that are driven mechanically (such via an electric motor), pneumatically, hydraulically, and/or via solenoid-actuation. The drive unit 74 pushes against, or otherwise engages, the post 70 so that the drive frame 68 may move vertically along the post 70. In preferred embodiments, the drive unit 74 comprises a pneumatic cylinder that pushes against the post 70 so that the drive frame 68 lifts upwardly. The drive unit 74 may comprise an electric motor, pump, or even a combustion engine to provide pneumatic pressure.

In some embodiments, the lift 10 may further comprise one or more cameras 80, 82, 84 and a display 86. The cameras 80, 82, 84 may be wired or wireless cameras positioned on the carriage 16 and/or the head saddle 18 for capturing images and/or video of an underside of the vehicle 12. One of the cameras 80 may be positioned on the head saddle 18 below the bars 56, 58 and oriented so that its lens is directed toward the underside of the vehicle 12. The other cameras 82, 84 may be located on either of the parallel beams 36, 38 of the outer frame member 24 and directed at the head saddle 18 for capturing images and/or video of the head saddle 18 relative to the axle housing 14 of the vehicle 12. The cameras 80, 82, 84 may have light systems, such as one or more LEDs, and/or a separate light system may be attached to the carriage 16 and/or head saddle 18. The cameras 80, 82, 84 may, via wired or wireless communication, transmit the captured images and/or video to the display 86. The cameras 80, 82, 84 may be positioned anywhere on the lift 10 without departing from the scope of the present invention. For instance, in addition to being directed upward toward the underside of the vehicle, the cameras 80, 82, 84 may, in some embodiments, be directed downward, forward, rearward, and/or laterally with respect to the lift 10. Furthermore, in some embodiments, the direction at which the cameras 80, 82, 84 are being aimed may be controlled by the operator of the lift 10, such as via a user interface 88 associated with the display 86, as discussed below. For instance, the lift 10 may include one or more electric motors configured to aim the cameras 80, 82, 84 where necessary under direction of the operator.

Figure 3:
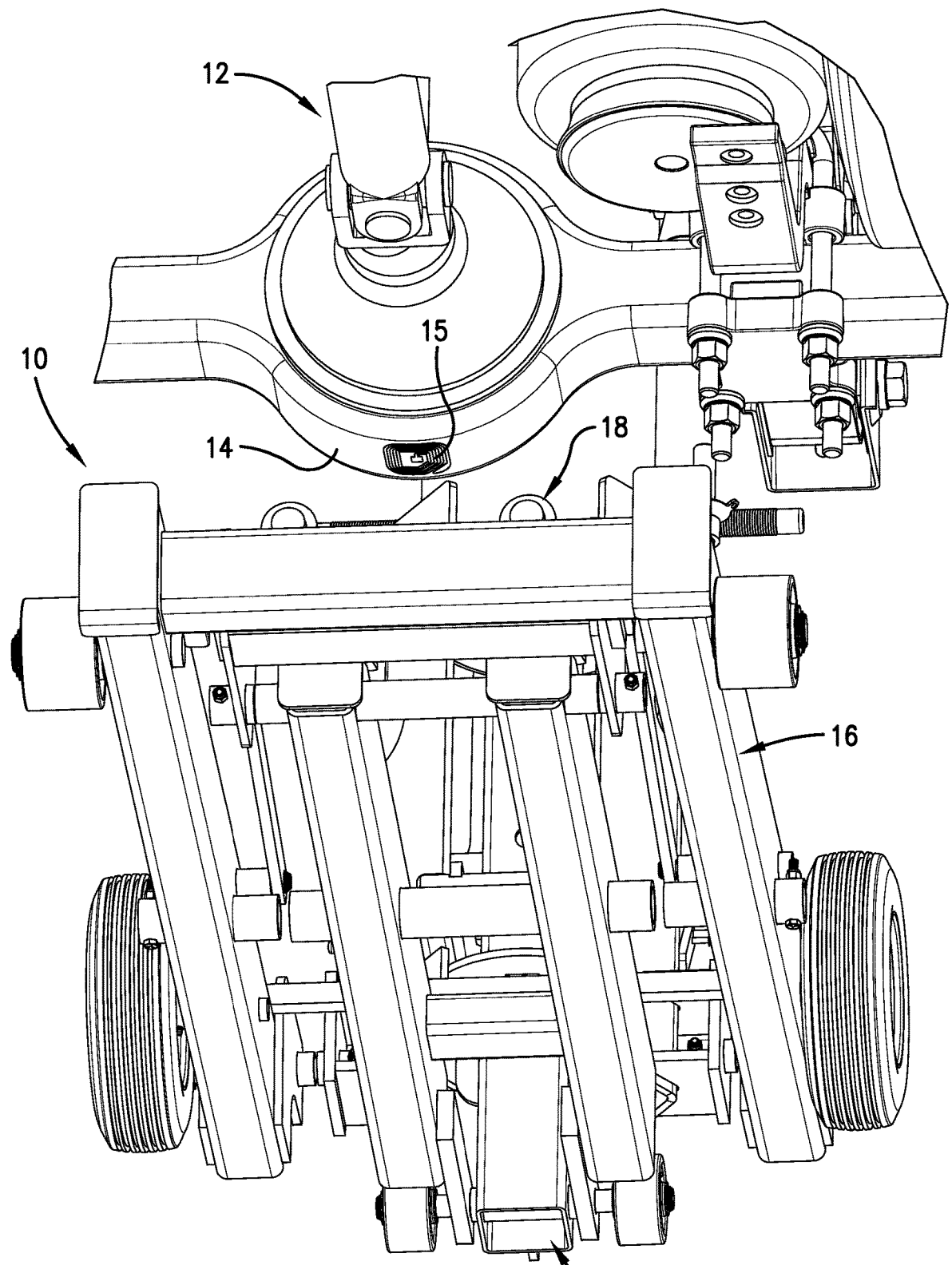
FIG. 3 illustrates a lowered perspective view of the portable lift depicted in FIG. 1 underneath the vehicle which has an indicator placed thereon.
Figure 4:
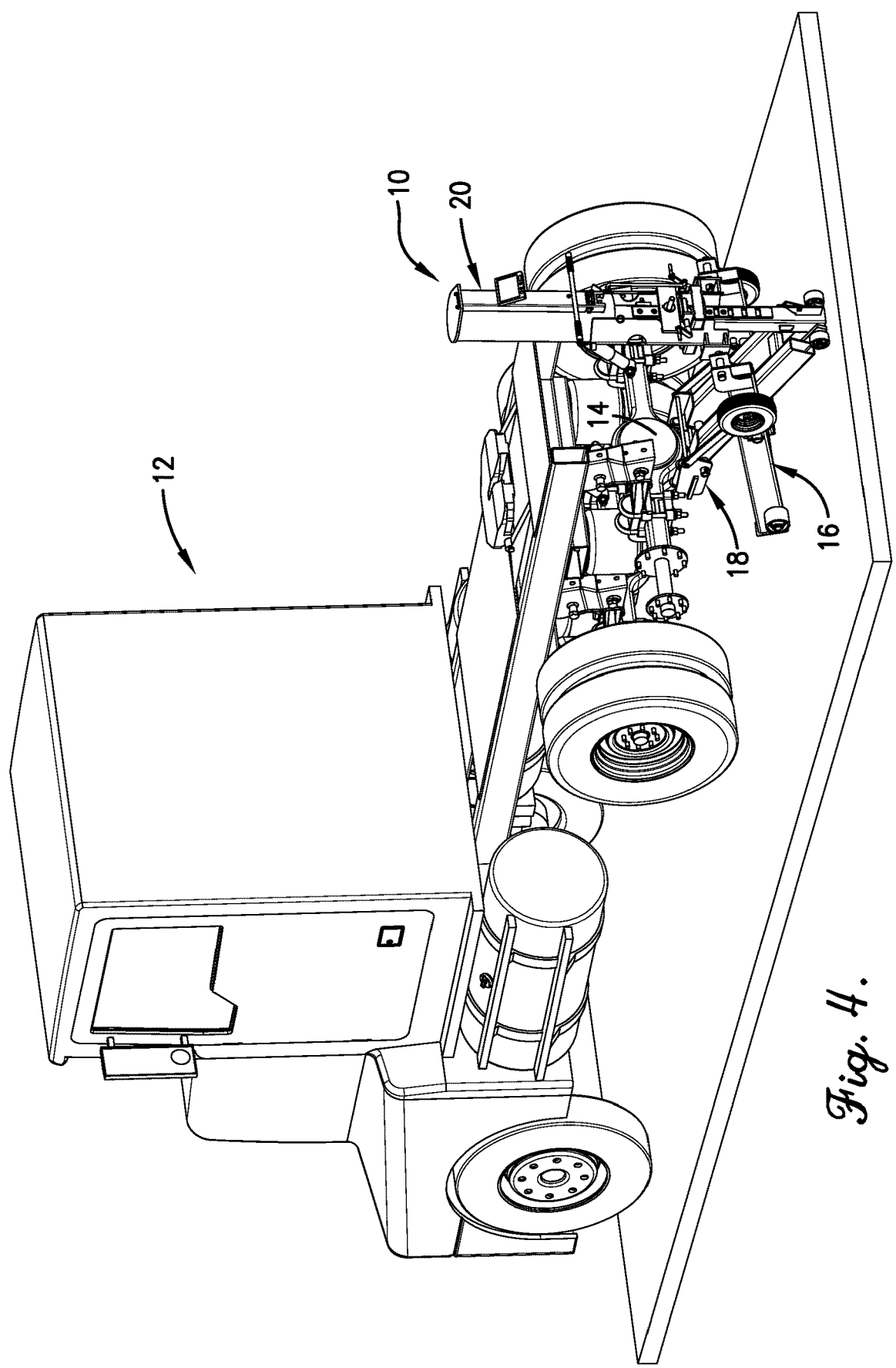
FIG. 4 illustrates the lift depicted FIG. 1 in engagement with a portion of the vehicle.

The display 86 displays images and/or video captured by the cameras 80, 82, 84 to help in maneuvering the lift 10 so that the head saddle 18 engages the axle housing 14 of the vehicle 12. The display 86 may be in wired or wireless communication with the cameras 80, 82, 84 and may be positioned on a back end of the drive frame 68 so that it is readily viewable by an operator when pushing the lift 10 under the vehicle 12. The display 86 may include a user interface 88 for controlling the lift 10. The user interface 88 may include a touch screen (separate from or integrated with the display 86) that enables enhanced operating features of the lift 10. The display 86 can be programmed to display a real-time video stream of the lift 10 positions and/or the vehicle 12 position as the vehicle 12 is lifted and/or lowered by the lift 10. The user interface 88 may additionally or alternatively comprise one or more inputs for receiving commands from a user, such as buttons, toggles, mouse pads, or the like. In some embodiments, an indicator 15 may be placed on the axle housing 14 to help align the head saddle 18 with the housing 14 (as depicted in FIG. 3). The indicator 15 may be a light, a sticker, a piece of tape, a radio-frequency identification (RFID) tag, a magnetic tag, or the like.

Figure 12:
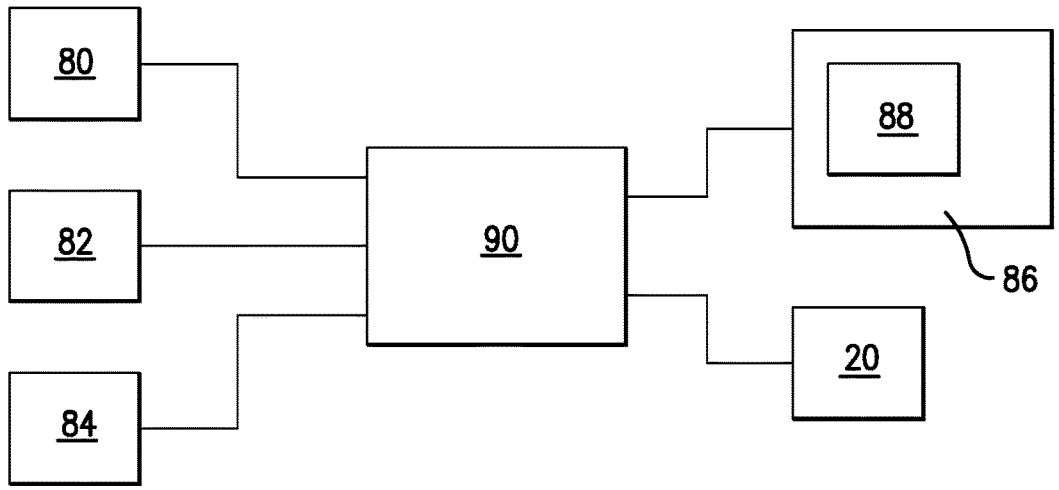
FIG. 12 illustrates various components of the portable lift shown in block schematic form.

In some embodiments, the lift 10 may include an electronic control system 90 as shown in FIG. 12 for controlling the display 86, the user interface 88, the operation of the lift driver 20, and/or the operation of the locking mechanism 72. The control system 90 may include a main power switch, an emergency-stop switch, a motion switch, an antenna, various communication lines, a transceiver element, a memory element, one or more sensors, and a processing element. The transceiver element, memory element, and processing element may be located on one or more circuit boards.

The emergency-stop switch is operable to be actuated by an operator of the lift 10. Upon actuation, the electronic control system is configured to send a signal via a communication line to cut electrical power to the holding valve of the lift 10. It is understood that the electronic control systems 90 may disconnect power to the holding valve by opening a circuit via a contact, such as a switch, relay, circuit breaker, or the like.

The motion switch selects the direction of movement of the head saddle 18 (raising or lowering) and causes the processing element to initiate raising or lowering of the head saddle 18. The emergency-stop and/or motion input components described above may alternatively be activated by a remote control device by use of a wireless link. It should be appreciated that it is within the scope of the present invention to provide for other input devices such as, but not limited to, a level sensor (not shown) adapted to determine the orientation of a lift.

The antenna and communication lines are provided for sending and/or receiving data and/or commands regarding the lift 10. The antenna and communication lines are connected to the transceiver and/or processing element and enable communication between the control system 90 and other systems/components and/or a technician's device.

The transceiver element may generally allow communication with systems or devices external to the control system 90. The transceiver element may include signal or data transmitting and receiving circuits, such as antennas, amplifiers, filters, mixers, oscillators, digital signal processors (DSPs), and the like. The transceiver element may establish communication wirelessly by utilizing RF signals and/or data that comply with communication standards such as cellular 2G, 3G, 4G, 5G, or LTE, WiFi, WiMAX, Bluetooth®, BLE, or combinations thereof. The transceiver element may be in communication with the processing element and the memory element.

The memory element may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element may be embedded in, or packaged in the same package as, the processing element. The memory element may include, or may constitute, a "computer-readable medium". The memory element may store the instructions, code, code segments, software, firmware, programs, applications, apps, services, daemons, or the like that are executed by the processing element.

The sensor may comprise a height sensing detector or sensor, which determines the height of the head saddle 18 relative to the ground and relays such information to the processing element. The height sensor is preferably a relative position sensor, such as one which employs an optical detector of spaced openings, markings, or the like. Such an optical detector (not shown) could be used with either a rotary or a linear set of markings. Alternatively, an absolute type of position encoder could be employed. Other input components may include the emergency-stop button, an interlock function switch, a mode selector switch, an up/down motion switch, and a communication channel selector switch. The emergency-stop button enables an operator to instruct the processing element to stop moving the head saddle 18. For safety, the interlock function switch is required to be engaged before lifting or lowering of the head saddle 18 can occur. The sensors may also include current sensors, voltage sensors, temperature sensors, or the like.

The processing element may be configured to control activation of the lift driver 20, the display 86, and/or the locking mechanism 72 and to communicate with the cameras 80, 82, 84. The processing element may include processors, microprocessors (single-core and multi-core), microcontrollers, DSPs, field-programmable gate arrays (FPGAs), analog and/or digital application-specific integrated circuits (ASICs), or the like, or combinations thereof. The processing element may generally execute, process, or run instructions, code, code segments, software, firmware, programs, applications, apps, processes, services, daemons, or the like. The processing element may also include hardware components such as finite-state machines, sequential and combinational logic, and other electronic circuits that can perform the functions necessary for the operation of the current invention. The processing element may be in communication with the other electronic components through serial or parallel links that include address busses, data busses, control lines, and the like.

In some embodiments, the lift 10 may further comprise a down stop mechanism 92. The down stop mechanism 92 may be attached to the driver frame 68 and may be configured to engage the post 70 to prevent the head saddle 18 from being suddenly lowered. For example, the post 70 may comprise a plurality of cavities 94 along its length. The down stop mechanism 92 may comprise a biased catch 96 and a release handle 98. The catch 96 may be biased to automatically enter consecutive cavities 94 as the driver frame 68 moves upward relative to the post 70 and only exit a cavity 94 if the driver frame 68 is raised further relative to the post 70 or released by the handle 98. The catch 96 abuts the post 70 in a cavity 94 so that the driver frame 68 cannot move downward relative to the post 70 when the catch 96 is in the cavity 94. The release handle 98 may be connected to the catch 96 so that when it is actuated, the catch 96 is pulled out of the cavity 94, which enables the driver frame 68 to move downward relative to the post 70. In certain embodiments, the lift 10 may be configured to sense and to present various information related to the down stop mechanism 92. For example, the lift 10 may include one or more sensors for sensing a status of the down stop mechanism 92 (e.g., engaged or unengaged). The lift 10 may be further configured to present information related to the status of the down stop mechanism 92 to the user of the lift 10, such as via the display 86 and/or via one or more lift indicators (e.g., colored lights, such as green and red lights) positioned on an exterior of the lifts 10.

While the lift 10 is depicted as configured to raise the head saddle 18 by raising the driver frame 68, the lift 10 may adjust the head saddle 18 height via other configurations without departing from the scope of the present invention. For example, the carriage 16 and/or lift driver 20 may be configured so that driving the driver frame 68 downward relative to the post 70 raises the head saddle 18, such as by attaching the post 70 to the first end 26 of the inner frame member 22 instead of the second end 28 of the inner frame member 22.

Figure 13:
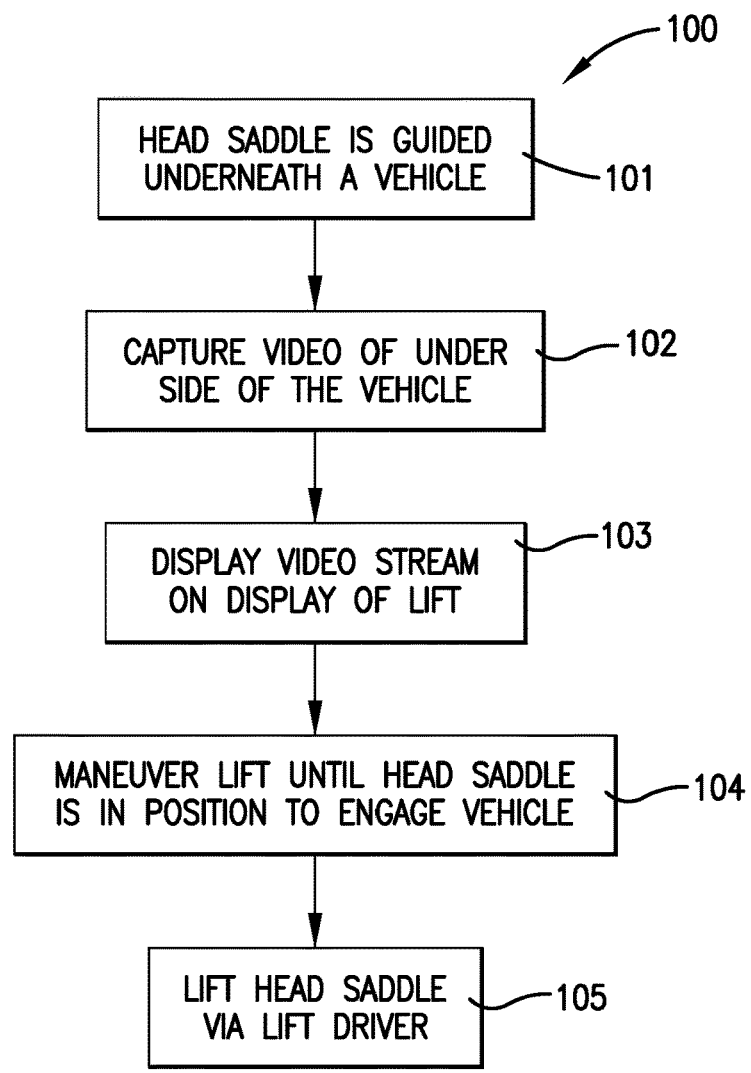
FIG. 13 illustrates a flowchart depicting a method of lifting a vehicle according to an embodiment of the present invention.

The flow chart of FIG. 13 depicts the steps of an exemplary method 100 of lifting a vehicle. In some alternative implementations, the functions noted in the various blocks may occur out of the order depicted in FIG. 13. For example, two blocks shown in succession in FIG. 13 may in fact be executed substantially concurrently, or the blocks may sometimes be executed in the reverse order depending upon the functionality involved. In addition, some steps may be optional.

The method 100 is described below, for ease of reference, as being executed by exemplary devices and components discussed as part of the embodiments illustrated in FIGS. 1-12.

Referring to step 101, a head saddle 18 of a lift 10 may be guided underneath a vehicle 12. The head saddle 18 may be guided underneath the vehicle 12 from a rear end of the vehicle 12, a side of the vehicle 12, or a front end of the vehicle 12.

Referring to step 102, a video stream of an underside of the vehicle 12 is captured via one or more cameras 80, 82, 84. The cameras 80, 82, 84 may be positioned on a carriage 16 of the lift 10 and/or on the head saddle 18 and oriented upwards toward the underside of the vehicle 12. One or more lights may be associated with the cameras 80, 82, 84 and used to provide light to and illuminate the underneath the vehicle 12 to facilitate capturing the video stream.

Referring to step 103, the video stream is displayed on a display 86 of the lift 10. The video stream may be a substantially real-time view underneath the vehicle 12. The video streams of one or more of the cameras 80, 82, 84 may be displayed simultaneously and/or toggled to be displayed. This step may include placing an indicator 15 on an axle housing 14 (or other portion) of the vehicle 12. The indicator 15 may include a light (such as an LED), a sticker, a piece of tape, a radio-frequency identification (RFID) tag, a magnetic tag, or the like. The indicator 15, the axle housing 14, and/or the head saddle 18 may all be displayed simultaneously to help align the head saddle 18 with the axle housing 14.

Referring to step 104, the portable lift 10 is maneuvered until the one or more video streams depict the head saddle 18 of the lift 10 being in position to engage a portion of the vehicle 12. The portable lift 10 may be maneuvered so that it rolls on a plurality of its wheels 30, 44, 46 until the head saddle 18 is aligned, for example with the indicator 15 and/or the axle housing 14. In some embodiments, this step 104 may include lowering the lift 10 so that a first pair of wheels 46 rotatably attached to an outer frame member 24 of the carriage 16 roll on the ground. The first pair of wheels 46 may be located between a first end 32 of the outer frame member 24 and an intermediate portion 54 of the outer frame member 24. Additionally, the lift 10 may be lowered so that a second pair of wheels 44 rotatably attached to the outer frame member 24 of the carriage 16 roll on the ground, wherein the second pair of wheels 44 are attached to a second end 34 of the outer frame member 24. The outer frame member 24 may be open-ended so that an inner frame member 22 rests in a space defined by the outer frame member 24.

Figure 5:
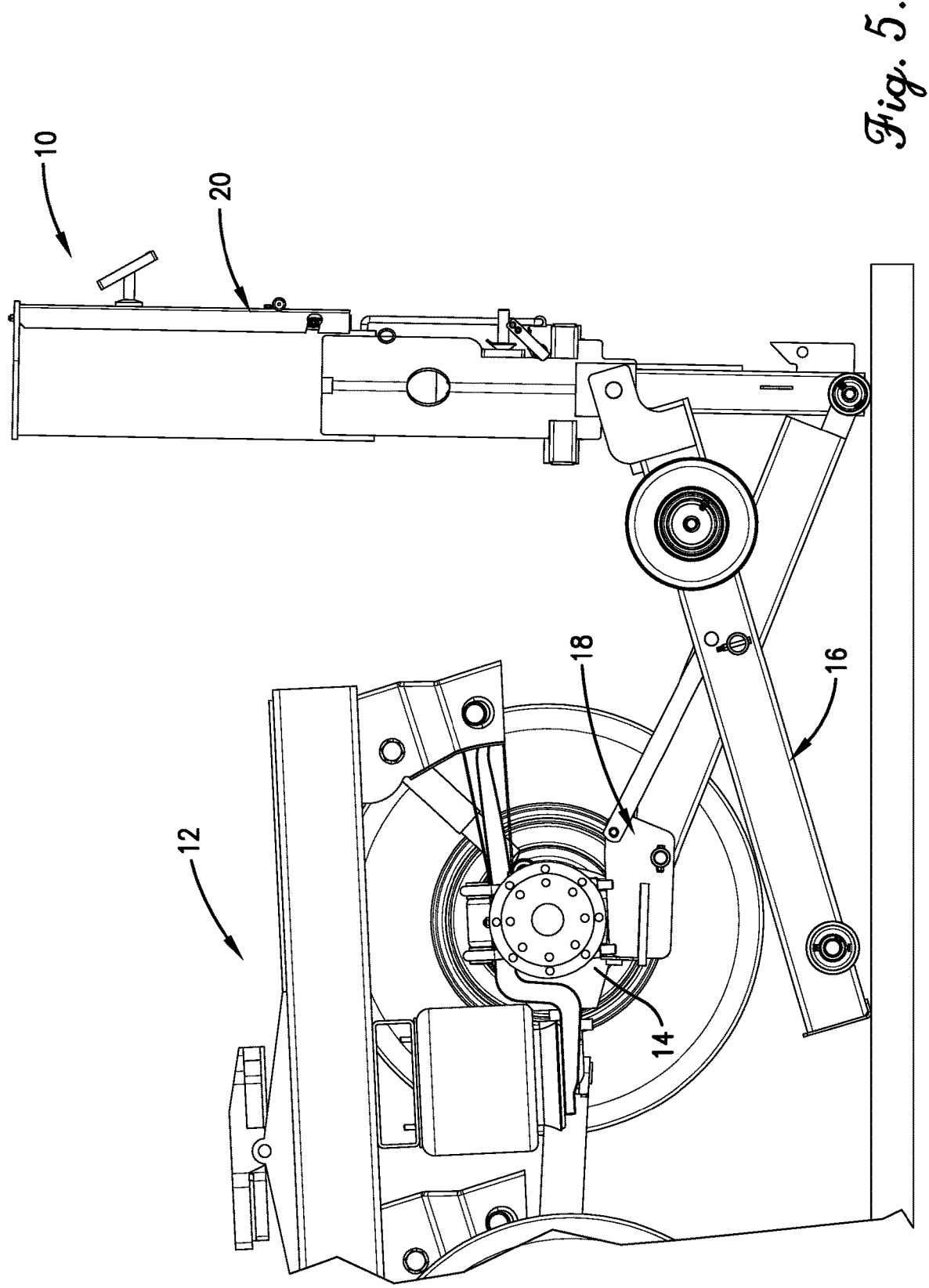
FIG. 5 illustrates a side view of the lift depicted in FIG. 1 in engagement with the portion of the vehicle.
Figure 6:
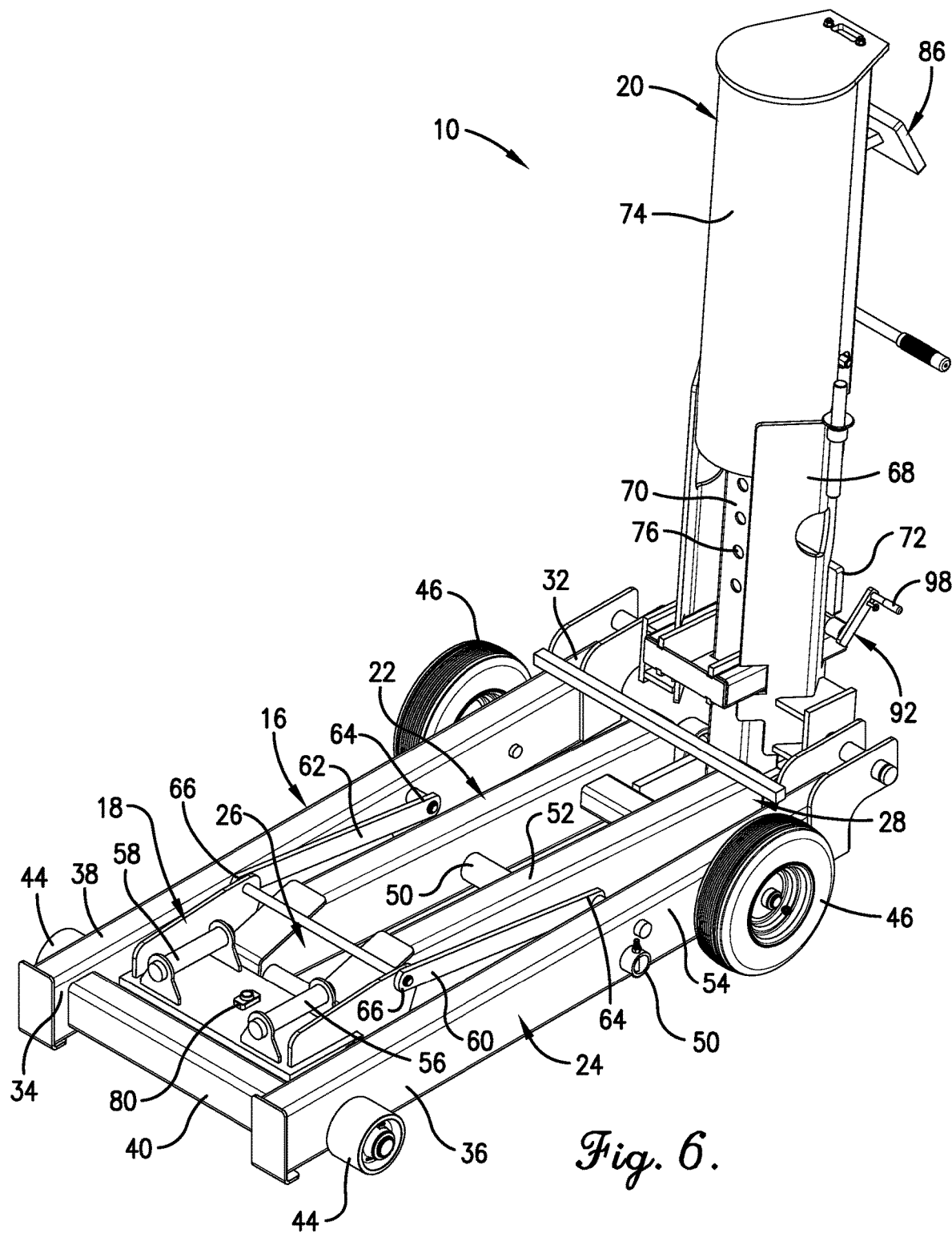
FIG. 6 illustrates a perspective front view of the lift depicted in FIG. 1 in a lowered position.
Figure 7:
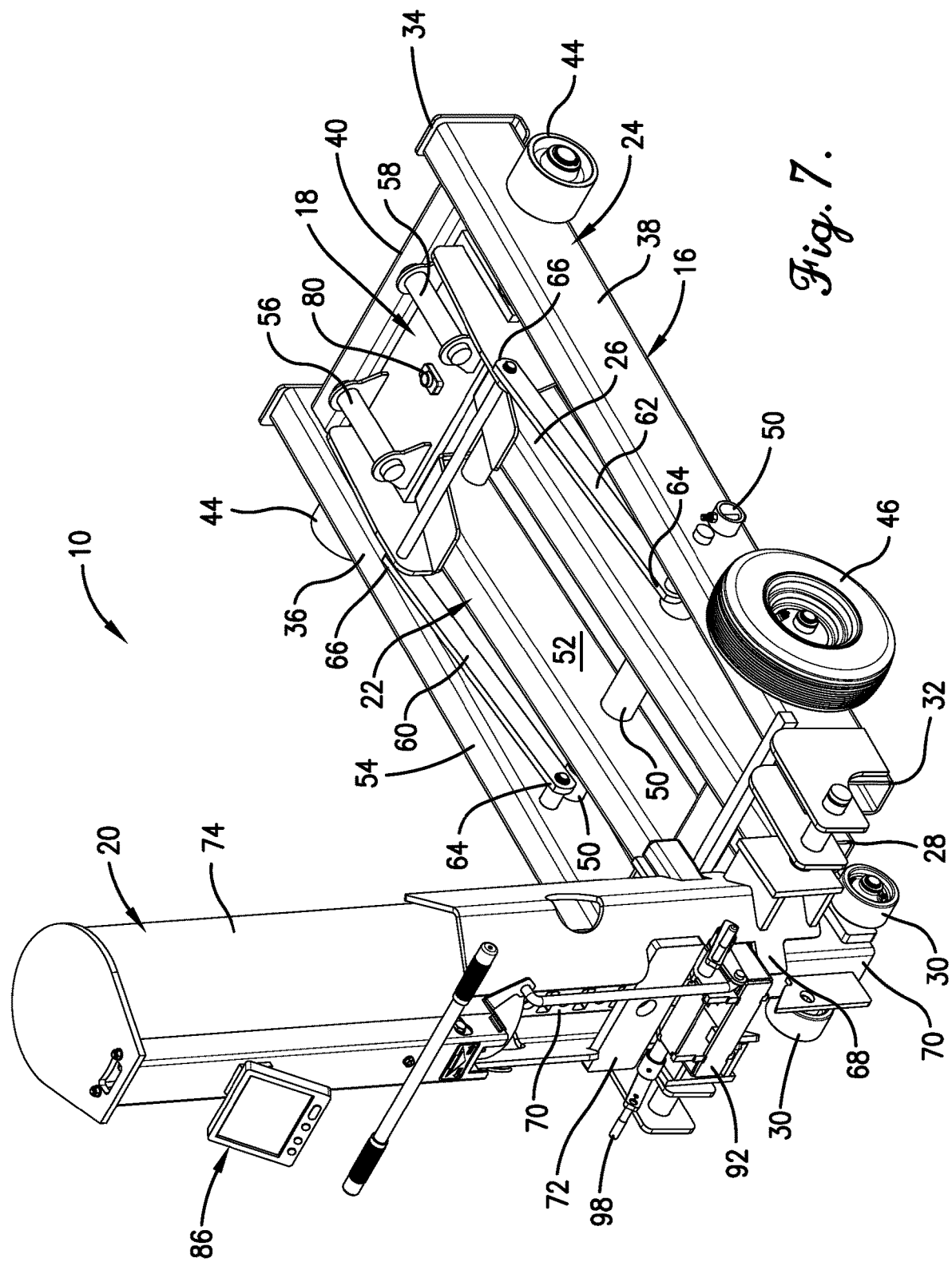
FIG. 7 illustrates a perspective rear view of the lift depicted in FIG. 1 in a lowered position.

Referring to step 105, the head saddle 18 is lifted, via a lift driver 20, into engagement with the portion of the vehicle 12 and lifted to a certain height to lift the vehicle 12. The head saddle 18 may be lifted by using the lift driver 20 to push against a post 70 and lift a driver frame 68. An end of the post 70 may be attached to the first end 26 of the inner frame member 22 of the lift 10 so that the second end 28 of the inner frame member 22 attached to the head saddle 18 pivots upwardly. The first end 32 of the outer frame member 24 may be attached to the driver frame 68 of the lift driver 20 so that when the drive frame 68 is lifted, the first end 32 of the outer frame member 24 is also lifted. The lifting of the outer frame member 24 will cause, via the scissor action, a corresponding raising of the first end 26 of the inner frame 22 (as well as the head saddle 18). One or more wheels 30 rotatably attached to the inner frame member 22 may be attached at the second end 28 of the inner frame member 22 so that as the driver frame 68 is lifted, the one or more wheels 30 roll against the ground toward a second end 34 of the outer frame member 24. As the outer frame member 24 is lifted, its first pair of wheels 46 may be lifted while the second end 34 of the outer frame 24 member statically engages the ground, as shown in FIG. 5. This enables the head saddle 18 to follow an arc of the axle housing 14 as the vehicle 12 is being lifted to prevent the head saddle 18 from sliding off the axle housing 14. Thus, the pair of wheels 46 are configured to be raised off the ground when the head saddle 18 is raised, while the wheels 30 are configured to remain in contact with the ground when said head saddle 18 is raised. Additionally, a horizontal orientation of the head saddle 18 may be maintained via a link 60 having a first end pivotally attached to the outer frame member 24 and a second end pivotally attached to the head saddle 18.

The method 100 may include additional, less, or alternate steps and/or device(s), including those discussed elsewhere herein. For example, the method 100 may include a step of securing said head saddle at a raised position via a locking mechanism of the lift. The head saddle may be secured via a retention pin that engages the post to secure the post at that length. For example, the retention pin may be secured to the driver frame and inserted into one of a plurality of holes in the post, thereby holding the post at a length associated with that hole.

In some embodiments, the lift 10 may be placed under the vehicle 12, such as a semi-tractor, until the head saddle 18 is below the rear tandem axle housing 14. Afterwards, the vertical lifting cylinder (e.g., of the drive unit 74) may be actuated with an air valve, thereby inputting air into the cylinder and initiating the scissor action, which would lift the head saddle 18. The head saddle 18 would then contact the bottom of the rear tandem axle housing 14, preferably under the differential, thereby "cradling" the axle housing 14; thus, this would prevent any side-to-side movement of the housing 14 on the head saddle 18. The vehicle 12 is raised until the tires associated with the rear tandem axle are off the ground. Thereafter, the vertical lifting cylinder can be lowered onto a down stop 92 and the load retention pin 78 can be inserted into one of the holes 76 of the post 70 such that the lift 10 functions as a support stand to support the vehicle 14. As such, the tires may be changed from the rear tandem axle. To remove the tires from the forward tandem axle, the head saddle 18 may be further raised, such that the tires associated with the forward tandem axle come off the ground. Thereafter, the vertical lifting cylinder can be lowered onto a down stop 92 and the load retention pin 78 can be inserted into one of the holes 76 of the post 70 such that the lift 10 functions as a support stand to support the vehicle 14. As such, the tires on the forward tandem axle may be changed. When tires have been changed on both tandem axles, the lift 10 may be lowered and removed from the work area, completing the service.

Accordingly, the portable lift 10 described herein may be a scissor-style lift with a vertical-lifting pneumatic cylinder, hydraulic cylinder, or ball screw, and a specially fabricated head saddle 18 designed to raise the rear of a semi-tractor by cradling the rear tandem axle housing 14. As discussed herein, the portable lift 10 may be equipped with down stops 92 and a load retention pin 78, which allows the lift 10 to not only function as a lifting device, but also as a vehicle support stand.

Furthermore, as described herein, the portable lift 10 can also be equipped with wired and/or wireless cameras 80, 82, 84 and a display 86 to aid in placing the head saddle 18 directly under the rear tandem axle housing 14. Using the cameras 80, 82, 84 and display 86 on the lift 10, a tire technician can accurately position the head saddle 18 under the rear tandem axle. The use of the cameras 80, 82, 84 and display 86 allows the tire technician to see where the head saddle 18 is in relationship to the rear tandem axle housing 14, thus eliminating the need for the technician to visually check the proper placement of the head saddle 18.

Additionally, and as discussed above, for correct placement of the head saddle 18 fore and aft on the rear tandem axle, a visual indicating device 15 can be permanently or temporarily attached to the bottom of the rear tandem axle housing 14. The visual indicating device 15 can be clearly represented in the camera 80, 82, 84 and shown on the display 86. Examples of visual indicating devices would include magnetic tags, markings created using paint or tape, and tags attached using adhesive.

Given the description provided above, the present invention provides an improved lift and an improved method of lifting a vehicle.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the invention has been described with reference to the embodiments illustrated in the attached drawing figures, it is noted that equivalents may be employed and substitutions made herein without departing from the scope of the invention as recited in the claims.

The invention claimed is:

1. A portable vehicle lift comprising:
   an inner frame comprising—
      a first end,
      a second end opposite the first end, and
      an intermediate portion located between the first end and the second end;
   an outer frame comprising—
      a first end,
      a second end opposite the first end, and
      an intermediate portion located between the first end and the second end and pivotally connected to the intermediate portion of said inner frame;
   a head saddle connected to the first end of said inner frame;
   a lift driver connected to said inner frame and said outer frame and configured to rotate said inner frame relative to said outer frame so as to shift said head saddle between a lowered position and a raised position; and
   a locking mechanism configured to secure said head saddle in the raised position,
   wherein said head saddle comprises a pair of spaced apart support elements configured to cradle an axle housing of a vehicle when said head saddle is in the raised position.

2. The portable vehicle lift according to claim 1, wherein said lift driver comprises a post connected to the second end of said inner frame and a driver frame movably attached to said post and connected to the first end of said outer frame so that movement of said driver frame adjusts a height of said head saddle.

3. The portable vehicle lift according to claim 1, wherein said inner frame and said outer frame are configured to rotate relative to one another in a scissor-like manner.

4. The portable vehicle lift according to claim 1, further comprising a first pair of wheels rotatably attached to said outer frame between the first end and the intermediate portion of said outer frame, wherein said first pair of wheels are configured to be raised off the ground when said head saddle is raised.

5. The portable vehicle lift according to claim 4, further comprising a second pair of wheels rotatably attached to said inner frame at the second end of said inner frame and a third pair of wheels rotatably attached to the second end of said outer frame, wherein said second pair of wheels is configured to remain in contact with the ground when said head saddle is raised.

6. The portable vehicle lift according to claim 1, further comprising a camera attached to said head saddle.

7. The portable vehicle lift according to claim 6, further comprising display configured to present images and/or video obtained from said camera.

8. The portable vehicle lift according to claim 1, wherein said head saddle comprises a pair of spaced apart support bars.

9. The portable vehicle lift according to claim 1, wherein the locking mechanism comprises a retention pin configured to be selectively engaged with a post of said lift driver.

10. The portable vehicle lift according to claim 9, wherein said post is connected to the second end of said inner frame, and wherein said lift driver further comprises a driver frame movably attached to said post and connected to the first end of said outer frame so that movement of said driver frame adjusts a height of said head saddle.

11. A method of lifting a vehicle, said method comprising the steps of:
   (a) guiding a head saddle of a portable lift underneath a rear end of the vehicle, wherein the portable lift includes an outer frame and an inner frame, with the head saddle being coupled with an end of the inner frame, wherein the head saddle further comprises a pair of spaced apart support elements;
   (b) lifting, via a lift driver of the portable lift, the head saddle into engagement with a portion of an axle of the vehicle, wherein during said lifting of step (b), the inner frame and the outer frame rotate with respect to each other in a scissor-like manner;
   (c) lifting, via the portable lift, the rear end of the vehicle at least partially off the ground, wherein during said lifting of step (c), the head saddle is lifted to a raised position and is configured to cradle an axle housing of the vehicle via the support elements of the head saddle being positioned on either side of the axle housing; and
   (d) locking, via a locking mechanism, the head saddle in the raised position.

12. The method according to claim 11, further comprising capturing images and/or video, via a camera of the portable lift, of an underside of said vehicle.

13. The method according to claim 12, further comprising presenting the images and/or video, via a display of portable lift.

14. The method according to claim 13, further comprising the step of maneuvering the portable lift until the images and/or video depict the head saddle of the portable lift being in position to engage the portion of the axle of the vehicle.

15. The method according to claim 11, wherein said lifting of step (b) comprises moving a driver frame of the lift driver relative to a post of the lift driver.

16. The method according to claim 15, wherein said lifting of step (b) comprises lifting a first end of the outer frame which is attached to the driver frame, and wherein the outer frame is pivotally attached to the inner frame so that lifting the outer frame causes the head saddle to be lifted into engagement with the portion of the axle of the vehicle.

17. The method according to claim 16, wherein the outer frame includes a first pair of wheels located between the first end and an intermediate portion of the outer frame, wherein the first pair of wheels are configured to be raised off the ground when the head saddle is lifted.

18. The method according to claim 17, further comprising a second pair of wheels rotatably attached to the inner frame and a third pair of wheels rotatably attached to a second end of the outer frame, wherein the second pair of wheels is configured to remain in contact with the ground when the head saddle is lifted.

19. The method according to claim 11, wherein the locking mechanism comprises a retention pin configured to be selectively engaged with a post of the lift driver.

20. The method according to claim 19, wherein upon said locking of step (d), the retention pin is engaged with a hole formed in the post of the lift driver.

* * * * *